United States Patent
Chen et al.

(10) Patent No.: US 11,005,613 B2
(45) Date of Patent: May 11, 2021

(54) MULTIPLE POWER CONTROL AND TIMING ADVANCE LOOPS DURING WIRELESS COMMUNICATION

(71) Applicant: QUALCOMM Incorporated, San Diego, CA (US)

(72) Inventors: Wanshi Chen, San Diego, CA (US); Hao Xu, San Diego, CA (US); Peter Gaal, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 545 days.

(21) Appl. No.: 14/162,664

(22) Filed: Jan. 23, 2014

(65) Prior Publication Data
US 2014/0204919 A1    Jul. 24, 2014

Related U.S. Application Data

(60) Provisional application No. 61/756,403, filed on Jan. 24, 2013.

(51) Int. Cl.
*G08C 17/00* (2006.01)
*H04L 5/00* (2006.01)
(Continued)

(52) U.S. Cl.
CPC ......... *H04L 5/0028* (2013.01); *H04B 7/2681* (2013.01); *H04W 52/221* (2013.01);
(Continued)

(58) Field of Classification Search
USPC ....... 370/252, 324, 329, 336, 345, 350, 503, 370/509, 328, 311, 318
See application file for complete search history.

(56) References Cited

U.S. PATENT DOCUMENTS

| 2009/0191875 A1 | 7/2009 | Vujcic et al. | |
| 2010/0182968 A1* | 7/2010 | Ojala ................. | H04W 72/042 370/329 |

(Continued)

FOREIGN PATENT DOCUMENTS

| CN | 101796739 A | 8/2010 |
| CN | 102118872 A | 7/2011 |

(Continued)

OTHER PUBLICATIONS

"3rd Generation Partnership Project; Technical Specification Group Radio Access Network; Evolved Universal Terrestrial Radio Access (E-UTRA); Physical layer procedures (Release 11 )", 3GPP Standard; 3GPP TS 36.213, 3rd Generation Partnership Project (3GPP), Mobile Competence Centre ; 650, Route Des Lucioles ; F-06921 Sophia-Antipolis Cedex ; Fance, vol. RAN WG1, No. V11.1.0, Dec. 20, 2012 (Dec. 20, 2012), pp. 1-160, XP050691223, [retrieved on Dec. 20, 2012], chapter 4; chapter 5.1.

(Continued)

*Primary Examiner* — Nguyen H Ngo
(74) *Attorney, Agent, or Firm* — Seyfarth Shaw LLP

(57) ABSTRACT

A method of wireless communication includes receiving a signal from an base station. The method also includes determining a timing advance loop from a set of timing advance loops, and/or a power control loop from a set of power control loops. The determination is based on the received signal.

24 Claims, 8 Drawing Sheets

(51) Int. Cl.
*H04W 52/22* (2009.01)
*H04W 56/00* (2009.01)
*H04B 7/26* (2006.01)
*H04W 52/54* (2009.01)

(52) U.S. Cl.
CPC ......... *H04W 52/54* (2013.01); *H04W 56/004* (2013.01); *H04W 56/0005* (2013.01); *H04W 56/0045* (2013.01)

(56) References Cited

U.S. PATENT DOCUMENTS

| | | | |
|---|---|---|---|
| 2011/0310830 A1* | 12/2011 | Wu | H04L 5/0032 370/329 |
| 2012/0250520 A1 | 10/2012 | Chen et al. | |
| 2012/0302240 A1* | 11/2012 | Tamaki | H04W 36/0016 455/436 |
| 2013/0058315 A1* | 3/2013 | Feuersanger | H04W 52/281 370/336 |
| 2013/0100938 A1* | 4/2013 | Kwon | H04W 56/0045 370/336 |
| 2013/0121264 A1* | 5/2013 | Heo | H04W 52/346 370/329 |
| 2013/0176953 A1* | 7/2013 | Stern-Berkowitz | H04W 52/281 370/329 |
| 2013/0279433 A1* | 10/2013 | Dinan | H04W 56/0005 370/329 |
| 2014/0071903 A1* | 3/2014 | Sorrentino | H04W 52/325 370/329 |
| 2014/0092829 A1* | 4/2014 | Han | H04L 5/0053 370/329 |
| 2014/0219185 A1* | 8/2014 | Etemad | H04W 52/34 370/329 |
| 2014/0293946 A1* | 10/2014 | Suzuki | H04W 48/12 370/329 |
| 2014/0321406 A1* | 10/2014 | Marinier | H04B 7/024 370/329 |
| 2015/0105119 A1* | 4/2015 | Eriksson | H04W 52/146 455/522 |
| 2015/0181546 A1* | 6/2015 | Freda | H04W 56/0015 370/336 |
| 2015/0215903 A1* | 7/2015 | Zhao | H04W 72/04 370/329 |
| 2015/0223178 A1* | 8/2015 | Pietraski | H04L 5/001 370/252 |

FOREIGN PATENT DOCUMENTS

| | | |
|---|---|---|
| EP | 2330843 A1 | 6/2011 |
| JP | 2013529403 A | 7/2013 |
| KR | 20120014033 A | 2/2012 |
| WO | 2011022567 A1 | 2/2011 |
| WO | 2011100673 A1 | 8/2011 |
| WO | 2011120716 A1 | 10/2011 |
| WO | 2012130173 A1 | 10/2012 |
| WO | 2012152917 A1 | 11/2012 |

OTHER PUBLICATIONS

Intel Corporation: "Enhancements on MAC procedures to support CA with multiple TA", 3GPP Draft; R2-113214 MTA MAC, 3rd Generation Partnership Project (3GPP), Mobile Competence Centre; 650, Route Des Lucioles ; F-06921 Sophia-Antipolis Cedex; France, vol. RAN WG2, No. Barcelona, Spain; May 9, 2011, May 3, 2011(May 3, 2011), XP050495381, pp. 1-6, [retrieved on May 3, 2011], the whole document.

International Search Report and Written Opinion—PCT/US2014/013056—ISA/EPO—dated Apr. 2, 2014.

Renesas Mobile Europe Ltd, "Further considerations on calculated timing advance for carrier aggregation", 3GPP TSG RAN WG4 #60, 3GPP Draft; R4-114253, 3rd Generation Partnership Project (3GPP), Mobile Competence Centre; 650, Route Des Lucioles; F-06921 Sophia-Antipolis Cedex; France, val. RAN WG4, No. Athens, Greece; Aug. 22, 2011, Aug. 17, 2011 (Aug. 17, 2011), XP050543351, [retrieved on Aug. 17, 2011].

IPWireless: "Release 7 Timing Advance (3.84 Mpcs and 7.68 Mcps TDD}", 3GPP TSG-RAN WG3 Meeting #52, Tdoc R3-060667, Shanghai, China, May 8-12, 2006, pp. 1-41.

* cited by examiner

MULTIPLE POWER CONTROL AND TIMING ADVANCE LOOPS DURING WIRELESS COMMUNICATION

CROSS-REFERENCE TO RELATED APPLICATION

This application claims the benefit under 35 U.S.C. § 119(e) to U.S. Provisional Patent Application No. 61/756,403 entitled "MULTIPLE POWER CONTROL AND TIMING ADVANCE LOOPS DURING WIRELESS COMMUNICATION," filed on Jan. 24, 2013, the disclosure of which is expressly incorporated by reference herein in its entirety.

BACKGROUND

1. Field

Aspects of the present disclosure relate generally to wireless communication systems, and more particularly to power control (PC) and timing advance (TA) loops during wireless communication.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

SUMMARY

In one configuration, a method of wireless communication is disclosed. The method includes receiving a signal from a base station. The method also includes determining a timing advance loop from a set of timing advance loops and/or determining a power control loop from a set of power control loops based on the received signal.

Another aspect is directed to an apparatus including means for receiving a signal from a base station. The apparatus also includes means for determining a timing advance loop from a set of timing advance loops and/or determining a power control loop from a set of power control loops based on the received signal.

In another configuration, a computer program product for wireless communications in a wireless network having a non-transitory computer-readable medium is disclosed. The computer readable medium has non-transitory program code recorded thereon which, when executed by the processor(s), causes the processor(s) to perform operations of receiving a signal from a base station. The program code also causes the processor(s) to determine a timing advance loop from a set of timing advance loops and/or determine a power control loop from a set of power control loops based on the received signal.

Another aspect of the present disclosure is directed to a wireless communication having a memory and at least one processor coupled to the memory. The processor(s) is configured to receive a signal from a base station. The processor(s) is also configured to determine a timing advance loop from a set of timing advance loops and/or determine a power control loop from a set of power control loops based on the received signal.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
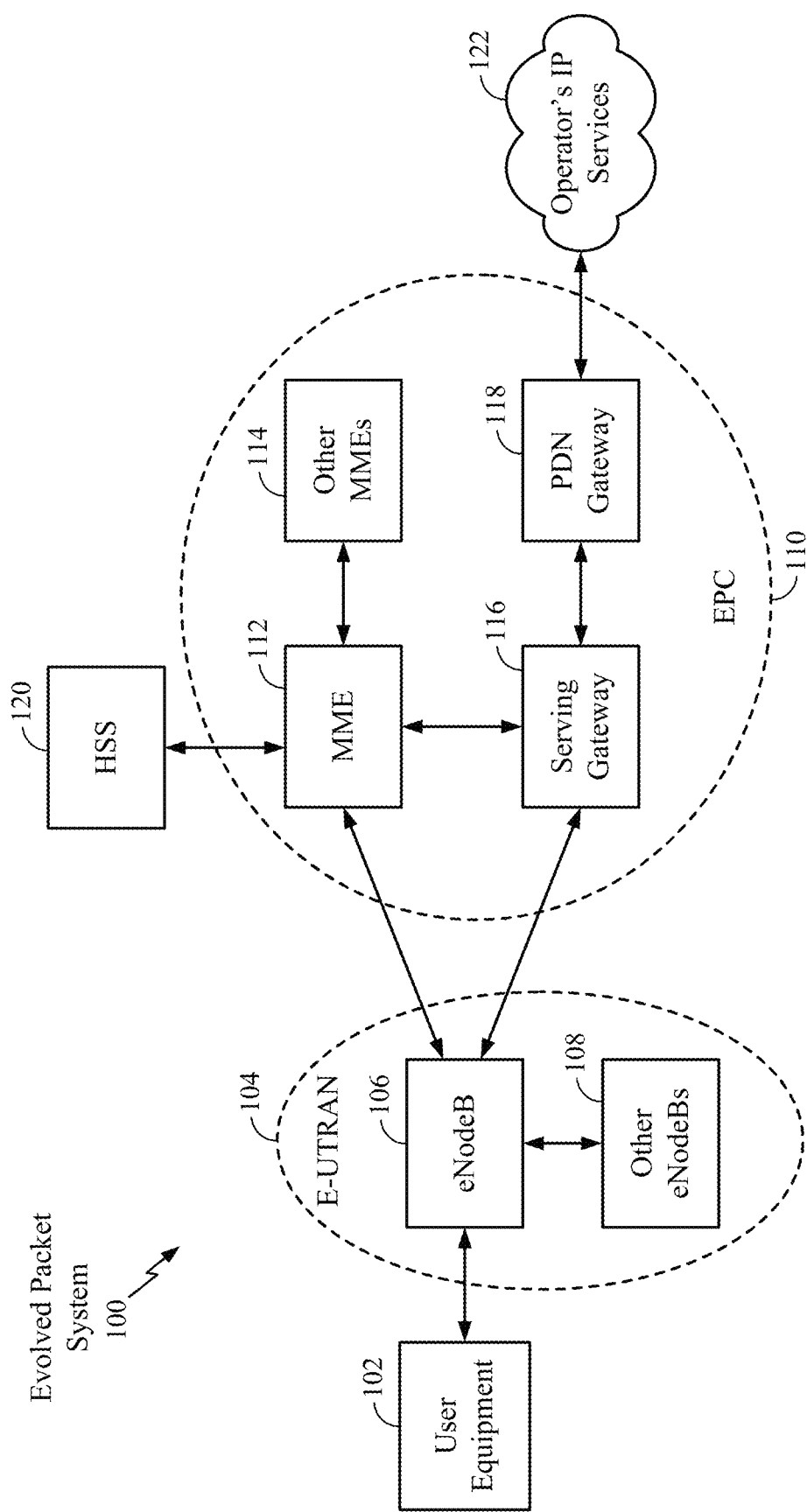
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
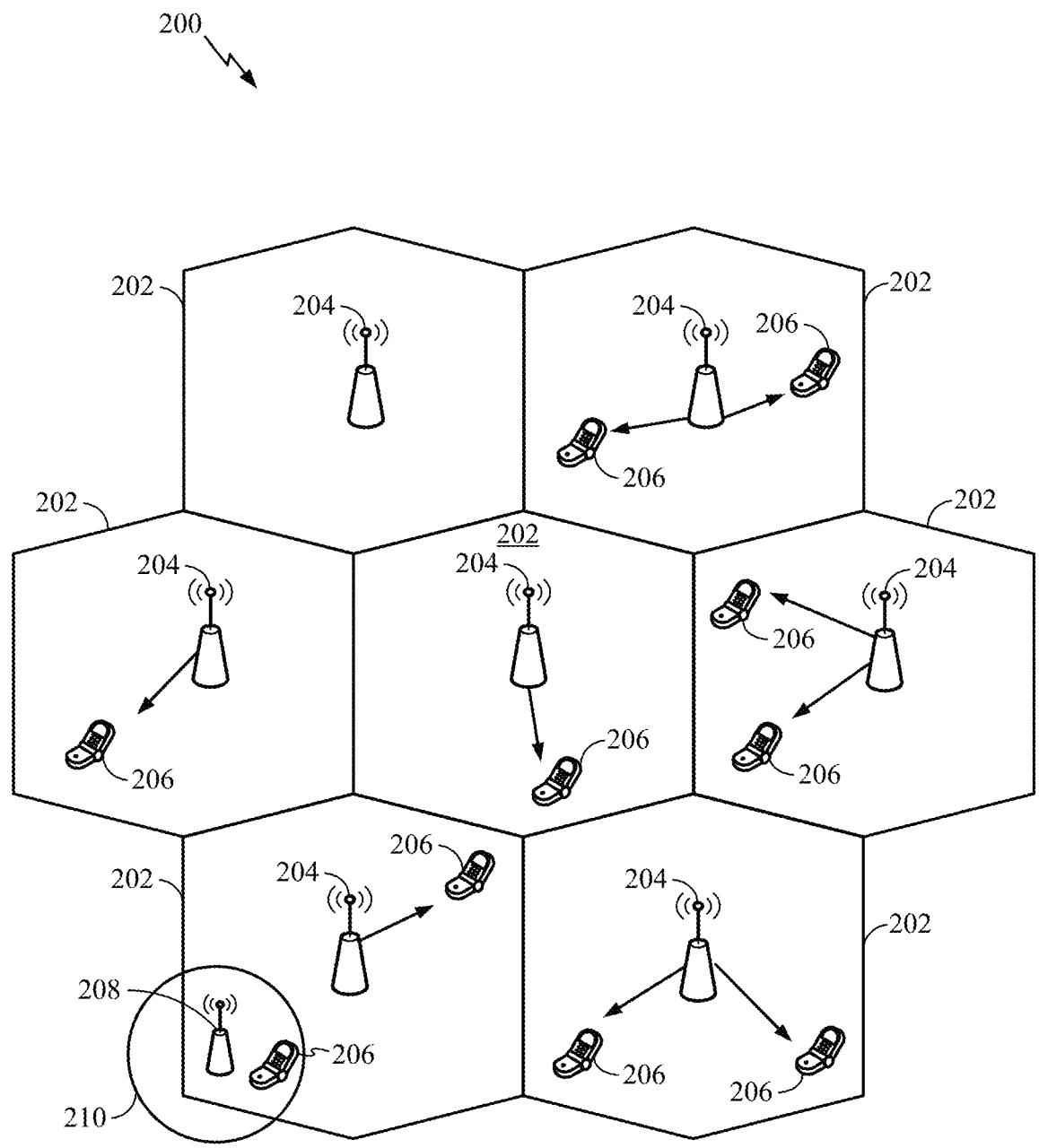
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. A lower power class eNodeB 208 may be a remote radio head (RRH), a femto cell (e.g., home eNodeB (HeNB)), a pico cell, or a micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
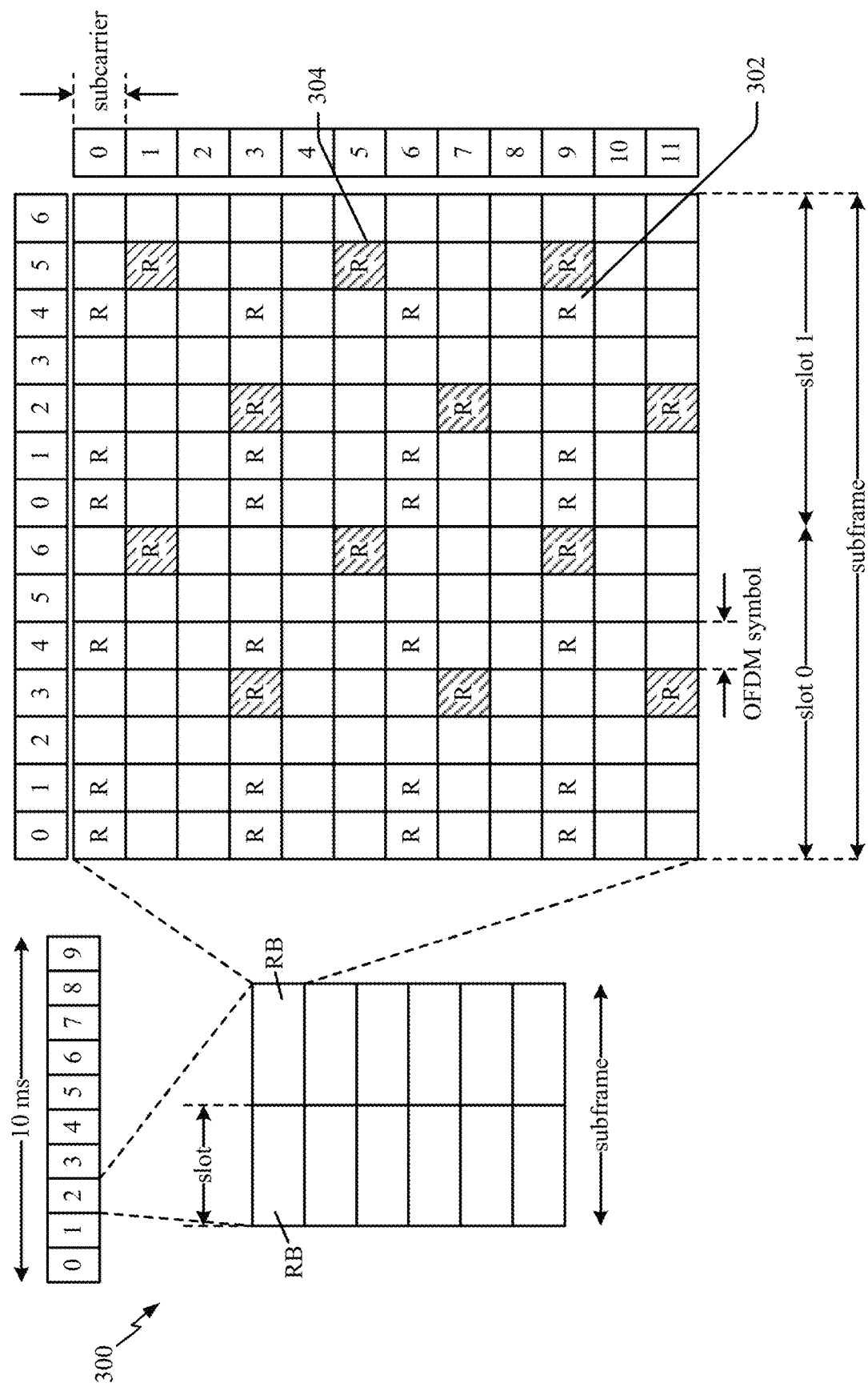
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, for a total of 84 resource elements. For an extended cyclic prefix, a resource block contains 6 consecutive OFDM symbols in the time domain, resulting in 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
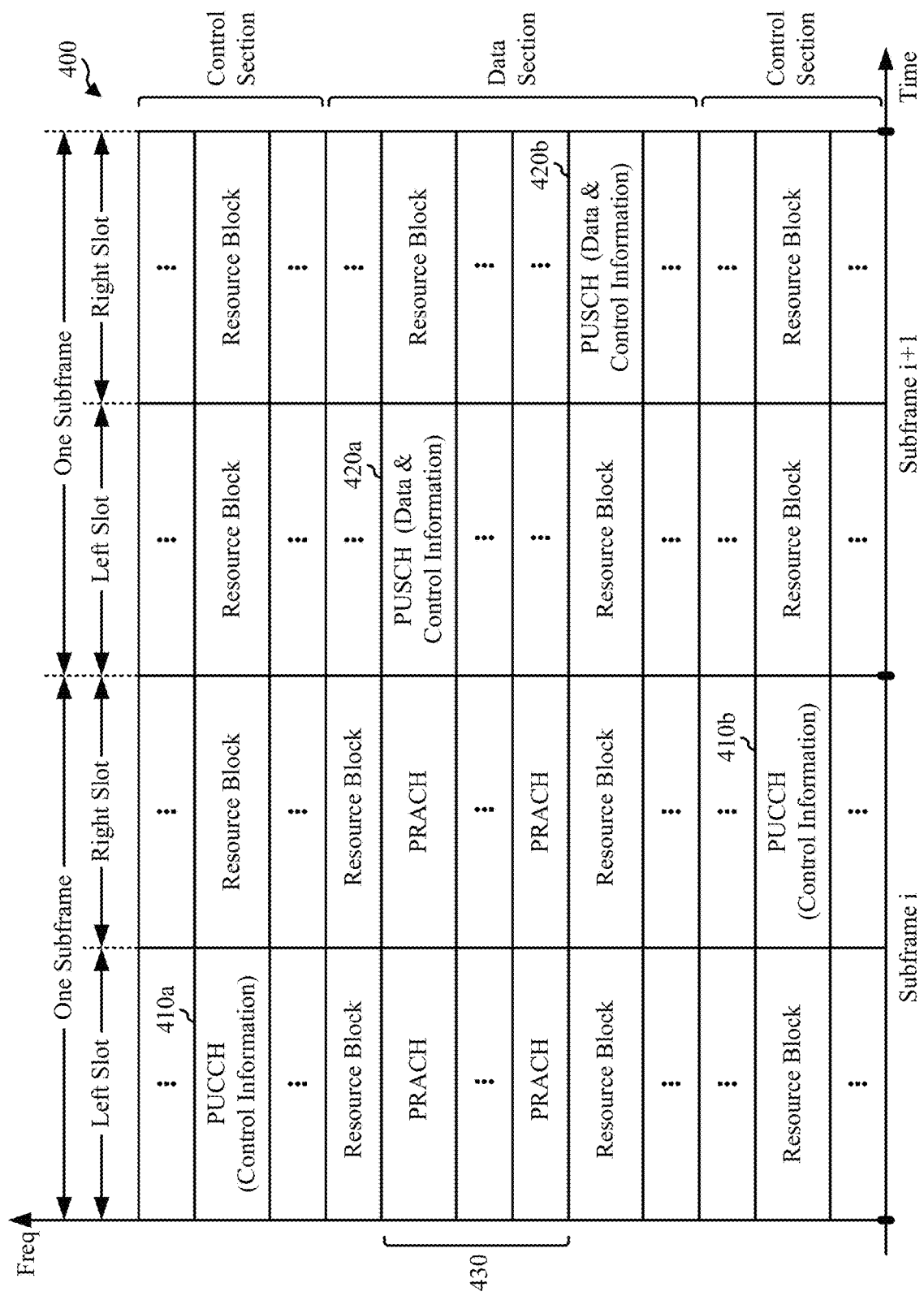
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
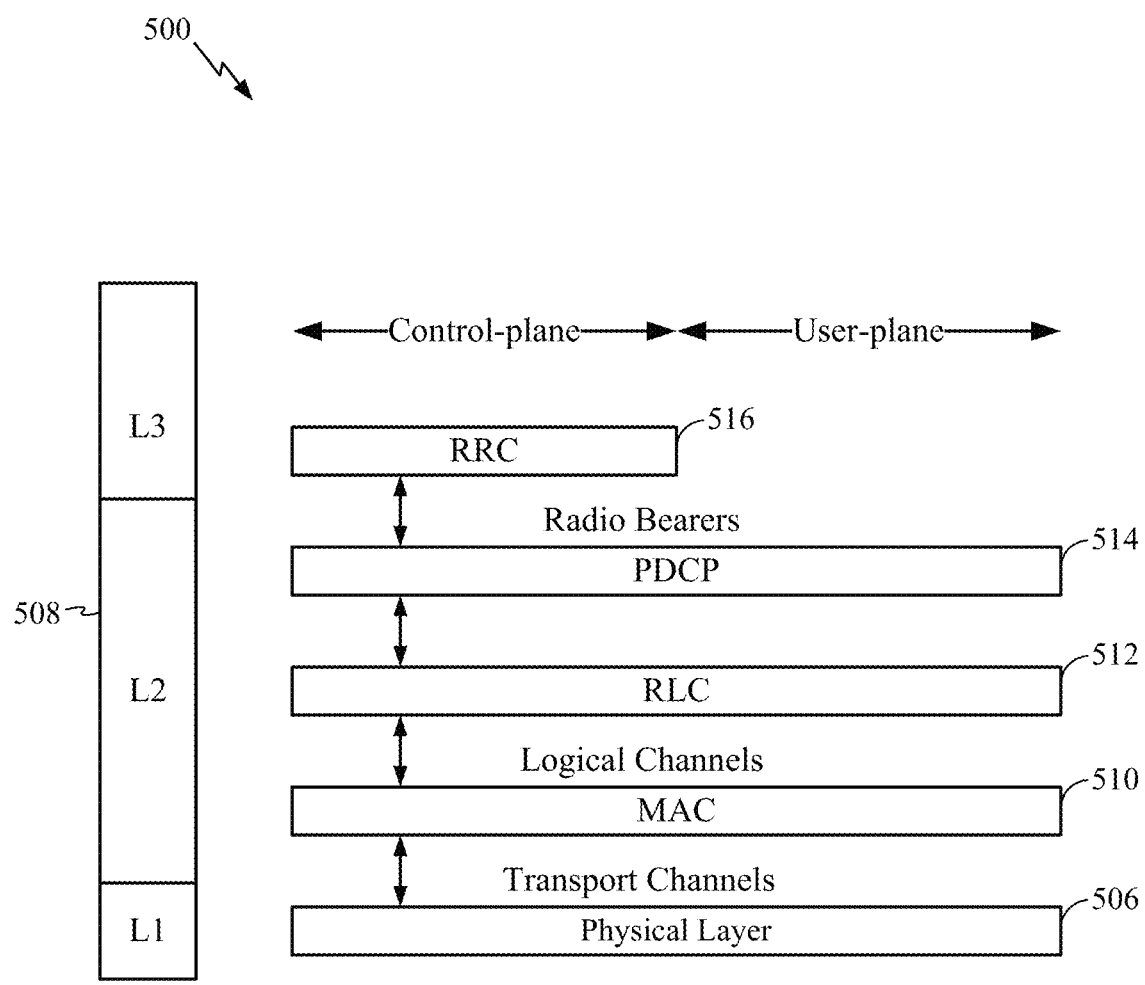
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
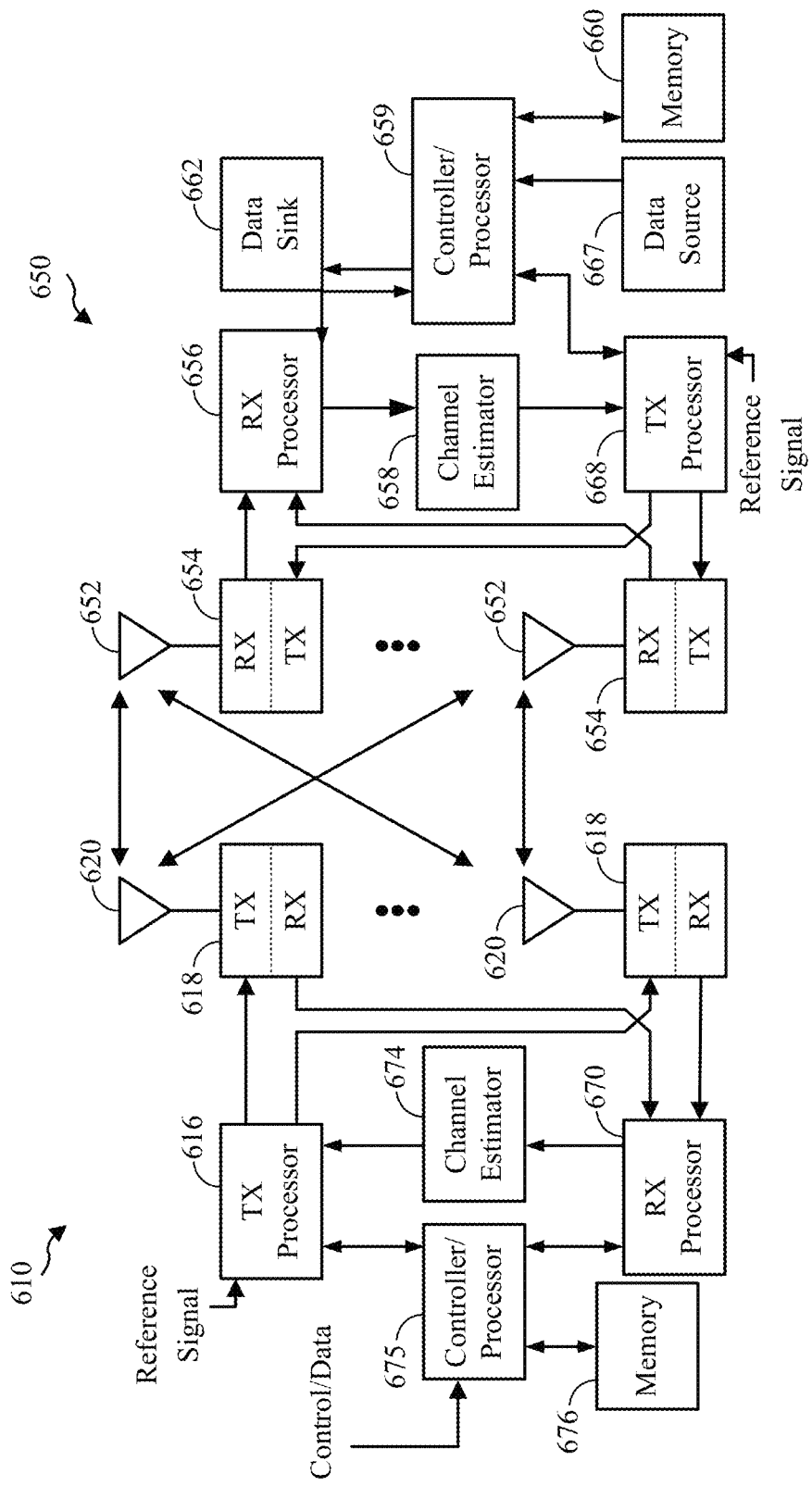
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675 implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the uplink, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the uplink, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

In LTE Releases 8, 9, and 10, a control channel, such as a physical downlink control channel (PDCCH), is located in a first several symbols in a subframe and is distributed in the entire system bandwidth. Moreover, the control channel is time multiplexed (TDMed) with a shared channel, such as a physical downlink shared channel (PDSCH). Thus, a subframe is divided into a control region and a data region In LTE Release 11, an enhanced control channel, such as the enhanced PDCCH (ePDCCH), is introduced. A typical control channel, such as PDCCH, occupies the first several control symbols in a subframe. In contrast, the enhanced control channel may occupy the data region, similar to the shared channel (PDSCH). The enhanced control channel may increase control channel capacity, support frequency-domain inter-cell interference coordination (ICIC), improve spatial reuse of control channel resources, support beamforming and/or diversity, operate on the new carrier type and in multicast broadcast style frequency network (MBSFN) subframes, and coexist on the same carrier as conventional user equipments (UEs).

A UE may be configured to monitor for the enhanced control channel in a subset of subframes or all subframes. In some cases, when a UE monitors an enhanced control channel UE-specific search space (USS) on a given carrier for a subframe, the UE does not monitor the typical control channel on the same carrier. In this case, the UE monitors a common search space (CSS) on the typical control channel. In other cases, for subframes not configured for monitoring the enhanced control channel, the UE monitors the common search space and the UE-specific search space on a typical control channel according to LTE Release 10 specifications.

A UE may be configured with up to two enhanced control channel resource sets, denoted as K. An enhanced control channel set is defined as a group of N physical resource block (PRB) pairs. Each resource set may have a specific size (e.g., 2, 4 or 8 physical resource block pairs). The total number of blind decoding attempts may be independent from K. The total number of blind decoding attempts for a UE may be split into K enhanced control channel sets. Each enhanced control channel set may be configured for a localized enhanced control channel or a distributed enhanced control channel. The physical resource block pairs of enhanced control channel sets with different logical enhanced control channel set indices may be fully overlapped, partially overlapped, or non-overlapping.

In some cases, the enhanced control channel demodulation reference signal (DM-RS) is specified to use the same scrambling sequence generator defined for a shared data channel demodulation reference signal. The scrambling sequence generator of demodulation reference signals for enhanced control channel on ports 107~110 may be initialized by:

$$c_{init}=(\lfloor n_s/2 \rfloor+1)\cdot(2X+1)\cdot 2^{16}+n_{SCID} \quad (1)$$

In equation 1, X is a virtual cell ID and is configured by UE-specific higher layer signaling. X has one value per set. The default value of X for the second set is the same as the value for the first set. Additionally, $n_s$ is a slot index, ranging from zero to nineteen. Furthermore, in equation 1, $n_{SCID}$ is equal to two.

LTE Release 11 supports coordinated multipoint transmission (CoMP). CoMP refers to coordinated transmissions from multiple eNodeBs (downlink CoMP) or receptions from one or more UEs (uplink CoMP). Downlink CoMP and uplink CoMP may be separately or jointed enabled for a UE. One example of a CoMP scheme is joint transmission (JT) where multiple eNodeBs transmit the same data meant for a UE. Another example of a CoMP scheme is joint reception where multiple eNodeBs receive the same data from a UE. CoMP schemes may also support coordinated beamforming (CBF) where an eNodeB transmits to the served UEs using beams that are chosen to reduce interference to UEs in neighboring cells. Additionally, CoMP schemes may support dynamic point(s) selection (DPS) where the cell(s) involved in data transmissions may change from subframe to subframe.

CoMP may exist in homogeneous networks and/or heterogeneous networks (HetNet). The nodes specified for a CoMP scheme may be connected via a wired connection, such as X2, and/or a wireless connection. In some cases, one or more virtual cell IDs may be configured for a UE on a shared channel for improved CoMP operation. The virtual cell ID may be dynamically indicated to the UE.

In LTE, an eNodeB controls uplink transmission timing by issuing timing advance (TA) commands. Timing advance commands are specified for the eNodeB to control the uplink timing of UEs in the given cell so that the received uplink signals of the UEs are synchronous. The synchronization may be desirable to reduce intra-cell interference and improve orthogonality of uplink signals.

The UE derives its uplink transmission timing based on the timing advance commands and the received downlink timing of the cell. In future LTE releases, two or more uplink timing branches may be specified, for each carrier, for a UE. For example, two or more uplink timing branches may be specified when dynamic switching is configured among downlink reference cells. More specifically, in one configuration, when dynamic switching is specified between two downlink reference cells (cell 1 and cell 2), a UE maintains two uplink timing branches: one timing branch for cell 1 and one timing branch for cell 2. Additionally, the timing advance commands may be cell dependent. That is, some commands are dedicated for cell 1 and other commands are dedicated for cell 2. The association of timing advance commands with a particular cell may be explicitly signalled or implicitly derived (e.g., associated with the serving cell of the shared channel).

In LTE, uplink power control (PC) may be defined as open loop power control (semi static configuration) or closed loop power control (with power control commands). For open loop power control, cell-specific and UE-specific open loop power control parameters may be indicated to the UE. The open loop power control is also based on an open loop path loss measurement. For closed loop power control, a UE is issued power control commands via unicast or groupcast control channels.

The power control may be applied to different types of channels. For a shared uplink channel, such as the physical uplink shared channel (PUSCH), closed loop power control may be specified in either an accumulative power control mode or an absolute power control mode. A UE is configured for a specific mode (e.g., accumulative power control mode or an absolute power control mode) via an upper layer. For accumulative power control, accumulated power control commands at subframe i are maintained via a function $f(i)=f(i-1)+\delta_{PUSCH}(i-K_{PUSCH})$, where $\delta_{PUSCH}$ is the received power control commands. Furthermore, the value $K_{PUSCH}$ defines the timing relationship. It should be noted that $K_{PUSCH}$ is greater than or equal to one. In one configuration, for frequency division duplexing, $K_{PUSCH}$ is four. In another configuration, for time division duplexing, the value of $K_{PUSCH}$ may be based on the downlink subframe configuration and the uplink subframe configuration.

For an uplink control channel, such as the physical uplink control channel (PUCCH), closed loop power control may be specified as an accumulative power control mode. Accumulated power control commands at subframe i are maintained via a function $g(i)=g(i-1)+\text{sum}\_\{m=0\}^{\{M-1\}} \delta_{PUSCH}(i-k\_m)$, where $\delta_{PUSCH}$ is the received power control commands, and the value k_m defines the timing relationship. It should be noted that k_m is greater than or equal to one. In one configuration, for frequency division duplexing, M equals one and k_0 equals 4. In another configuration, for time division duplexing, the values of M and k_m may be based on the downlink subframe configuration and the uplink subframe configuration.

For a sounding reference signal, the power control may be associated with the shared uplink channel via the function f(i). In one configuration, the power offset for the sounding reference signal may be configured separately from the power offset for the shared uplink channel.

In some cases, a UE reports its power headroom to the eNodeB. The reporting may be periodic, event driven, and/or based on a condition. The power headroom may be derived from the shared uplink channel transmit power and/or the physical control channel. The power headroom may be further derived from the maximum transmit power.

In LTE Release 10, a UE may be configured with two or more component carriers. One of the component carriers is configured as the primary component carrier (PCC). The primary component carrier may also be referred to as the primary cell or PCell. A cell is a combination of a downlink component carrier (CC) and an uplink component carrier.

Regardless of how many component carriers are configured for a UE, the uplink control channel may only be transmitted on the primary component carrier. The UE maintains separate accumulative power control loops for each shared uplink channel of the component carriers. The power control loops are maintained by the function $f_c(i)$ as part of the configured cells or component carriers for carrier aggregation. In the function $f_c(i)$, c is a serving cell or component carrier index.

As previously discussed, there may be only one uplink control channel specified for the UE. Accordingly, when only one uplink control channel is specified, there is only one power control function g(i). When a power limitation is specified, the UE may perform power prioritization among the uplink channels. The uplink control channel is given the highest priority and the shared uplink channel is given the next highest priority. The power headroom report (PHR) is reported for two types, type 1 and type 2. Type 1 does not include the uplink control channel and the power headroom report is based on the shared uplink channel. Type 2 includes the uplink control channel and the power headroom report is based on the uplink control channel and the shared uplink channel.

In future releases, two or more uplink power control operations may be specified for each component carrier. The two or more power control operations may be open loop power control and/or closed loop power control. The power control operation may be explicitly or implicitly indicated to the UE.

For open loop power control, the UE may be configured with two or more CSI-RS sets. The UE may receive an indication for the CSI-RS set to use for open loop power control management. Specifically, the UE may be configured with the CSI-RS set for path loss measurement to derive the open loop power control.

For closed loop power control, the UE may be configured with two or more CSI-RS sets. The UE may receive an indication for the CSI-RS set to use for closed loop power control management. For example, a UE may maintain two or more power control functions $f_s(i)$, and/or two or more power control functions $g_s(i)$. For the power control functions, s is the index of the serving cell(s). Separate power headroom reports may be reported accordingly based on the set s. Separate power control commands may be transmitted to the UE based on the set s. That is, the power control commands may be set dependent.

When the UE is configured to have two or more uplink timing and/or uplink power control loops as discussed above, it is desirable to provide timing advance commands and/or power control commands for each of the loops. An indication for a timing advance command and a timing advance loop can be explicit or implicit. Likewise, an indication for a power control command and a power control loop may be explicit or implicit. Aspects of the present disclosure will describe how to explicitly or implicitly determine a timing advance loop or power control loop for use in an uplink control channel or data channel. Furthermore, aspects of the present disclosure will describe how to associate a timing advance command with a timing advance loop. Additionally, aspects of the present disclosure will describe how to associate a power control command with a power control loop.

In one configuration, the timing advance loop may be explicitly determined via a timing advance loop index (TLI) information field. The timing advance loop index information field may be included as a field in the downlink control information (DCI). The number of bits for the timing advance loop index may be log 2(M) for M timing advance loops. Thus, for example, if there are two timing advance loops, then the timing advance loop index may be one bit (e.g., log 2(2)). Moreover, the timing advance loop index may be specified for only downlink mode dependent downlink control information formats (e.g., downlink control information formats 1/1B/1D/2/2A/2B/2C/2D), uplink MIMO downlink control information format (format 4), and/or only in a UE-specific search space. Accordingly, to maintain backward compatibility, the timing advance loop index may not be specified for downlink control information formats 1A/0. More specifically, the timing advance loop index may not be specified in a common search space.

In another configuration, a timing advance command may be explicitly associated with a timing advance loop via an index of the timing advance loop in the media access control (MAC) payload and the corresponding timing advance command(s) for each of the M loops. The number of M loops may be greater than one. The timing advance loop index associates the timing advance commands with specific loops.

In yet another configuration, when two or more enhanced control channel sets are configured for a UE, the timing advance loop index and/or timing advance command association may be implicitly determined via the enhanced control channel set. Specifically, if a downlink control information is detected in a first enhanced control channel set (ePDCCH set one), the first timing advance loop is used for the corresponding uplink transmission (control transmission or data transmission). Additionally, if a downlink control information is detected in a second enhanced control channel set (ePDCCH set two), the second timing advance loop is used for the corresponding uplink transmission.

Alternatively, other implicit associations may be specified. In one configuration, the implicit association may be based on a downlink control information type, control channel decoding candidates, virtual cell ID for a control transmission and/or a data transmission, subframe indices, subframe types, downlink control information formats, and/or a localized or distributed enhanced downlink control channel. In one configuration, the UE monitors different subframes for the typical downlink control channel and the enhanced downlink control channel. Therefore, the typical control channel may be associated with the first timing advance loop and the enhanced control channel may be associated with the second timing advance loop.

For example, if a first virtual cell ID is used by a control channel (or indicated in the control channel for the shared downlink channel or the shared uplink channel), the corresponding uplink transmission is associated with the first timing advance loop. Furthermore, if a second virtual cell ID is used by a control channel (or indicated in the control channel for the shared downlink channel or the shared uplink channel), the corresponding uplink transmission is associated with the second timing advance loop.

In some cases, there may be N1 power control loops for the shared uplink channel and N2 power control loops for the uplink control channel. N1 may or may not be equal to N2. In one configuration, for explicit determination/association, a power control loop index (PLI) information field may be specified to indicate the power control loop that is associated with the shared uplink channel. The explicit determination/association may be specified for downlink control information scheduling for the shared uplink channel. The number of bits for the power control loop index information field may be based on the function log 2(N2) bits for downlink grants.

In another configuration, the 2-bit transmit power control (TPC) command in the downlink control information may be associated with a specific loop determined by the power control loop index information field. Additionally, the 2-bit transmit power control command may be extended to cover more than one loop in one downlink control information type. That is, the number of bits may increase to identify more loops. In one configuration, the transmit power control command may be extended to 2*N1 transmit power control bits. For example, if N1 equals two, the transmit power control command may be 4 bits so that two transmit power control bits may be specified for each loop. The present configuration improves the flexibility of the system and provides for a simpler solution. Still, the present configuration may increase overhead. The overhead may be increased when N1 is large. Still, N1 may be limited to a low value, such as 2.

In another configuration, K bits may be specified for the transmit power control command. Specifically, the transmit power control commands may be jointly coded for the N1 loops or the N2 loops. In the present configuration, K is greater than two and less than 2N1. As an example, if N1 is two, K may be three bits. In this example, the radio resource control may configure eight sets, each set specifying a transmit power control command and its applicability (for one of the two loops or both loops). Each of the eight values represented by the three bits is mapped to one of the radio resource control configured eight sets. The present configuration may decrease overhead while decreasing flexibility. This configuration is a hybrid configuration using radio resource control signalling with fewer bits (three in this example).

In another configuration, the power control loop index may be separately or jointly coded with the timing advance loop index. The jointly coded power control loop index and timing advance loop index may be referred to as a power control and timing advance loop index (PTLI). The present configuration reduces the overall total number of bits. For the power control and timing advance loop index, a one-to-one mapping may be defined to associate a power control loop and a timing advance loop. In another configuration, a many-to-one or a one-to-many mapping may be defined. The many-to-one and one-to-many mapping may be defined when the number of power control loops and the number of timing advance loops are different.

As an example, a first loop is associated with both a first timing advance loop and a first power control loop, furthermore, a second loop is associated with both a second timing advance loop and a second power control loop. As another example, if the bit for the power control and timing advance loop index is zero, a first loop is specified for both the timing advance loop and power control loop. Alternatively, if the power control and timing advance loop index bit is one, a second loop is specified for both the power control loop and the timing advance loop.

In yet another configuration, the number of bits used for the power control and timing advance loop index is based on the number of loops or a radio resource control (RRC) configuration. For example, three bits may be used for the power control and timing advance loop index to indicate four power control loops and four timing advance loops (i.e., eight out of 16 possible combinations).

In one configuration, a power control loop index may be indicated in the downlink control information used for scheduling downlink transmissions and similar processing can be performed for an uplink control channel. The loop index may be indicated with log 10(N2) bits. That is, the number of bits depends on the number of loops. Furthermore, the bits used for the transmit power control command may remain unchanged and associated with the indicated loop.

In another configuration, the number of bits used for the transmit power control command may be extended. The power control loop index and possible extension of transmit power control commands can be applied only for some downlink control information formats. That is, the power control loop index may only be specified for downlink mode dependent downlink control information formats (e.g., downlink control information formats 1/1B/1D/2/2A/2B/2C/2D), uplink MIMO downlink control information format (format 4), group power control formats (3/3A), and/or in a UE-specific search space. To maintain backward compatibility, the power control loop index may not be specified for downlink control information formats 1A/0 at least in a common search space. The transmit power control commands in downlink control information formats 1A/0 may be associated with a fixed power control loop, such as the first loop.

In another configuration, existing bits in the current downlink control information formats may be used to indicate a power control loop without any extension to the existing format. Specifically, in one configuration, the 2-bit shared downlink channel rate matching and quasi-co-location indicator (PQI) in downlink control information format 2D may be used. That is, the existing bits may be re-interpreted, instead of adding new bits. For example, a configuration of 00/10 may specify that the 2-bit transmit power control is for the first loop. Furthermore, a configuration of 10/11 may specify that the 2-bit transmit power control is for the second loop. Additionally, for another configuration, the 1-bit scramble ID ($n_{SCID}$) in downlink control information format 2D may be used for the transmit power control. For example, when the $n_{SCID}$ is zero the first loop is specified and when the $n_{SCID}$ is 1 a second loop is specified. A combination of the PQI and $n_{SCID}$ may also be used to indicate the power control loop in yet another configuration.

In still another configuration, the power control loop may be implicitly associated with an enhanced control channel set. That is, when two or more enhanced control channel sets are configured for the UE, the UE may determine the power control loop and the associated power control commands based on the enhanced control channel set index. Thus, additional downlink control information bits are not added.

For example, when two power control loops are specified for the shared uplink channel, two power control loops are specified for the uplink channel, and two enhanced control channel sets are configured for the UE, the power control loops may be determined based on a specified enhanced control channel set. Based on the present example, when a downlink grant is detected in a first enhanced control channel set (ePDCCH set 1), the transmit power control command in the downlink grant is determined to be for an uplink control channel power control loop 1 and the uplink control channel power control loop 1 is used for a corresponding subframe. When a downlink grant is detected in a second enhanced control channel set (ePDCCH set 2), the transmit power control command is determined to be for uplink control channel power control loop 2 and the uplink control channel power control loop 2 is used for a corresponding subframe. Furthermore, when an uplink grant is detected in a first enhanced control channel set (ePDCCH set 1), the transmit power control command is determined to be for an shared uplink channel power control loop 1 and the shared uplink channel power control loop 1 is used for a corresponding subframe. Finally, when an uplink grant is detected in a second enhanced control channel set (ePDCCH set 2), the transmit power control is determined to be for the shared uplink channel power control loop 2 and the shared uplink channel power control loop 2 is used for a corresponding subframe.

As an example, when the backhaul between two nodes for a CoMP or multiflow operation is below a threshold (e.g., non-ideal), a first enhanced control channel (ePDCCH set 1) is transmitted from a first node and a second enhanced control channel set (ePDCCH set 2) is transmitted from a second node. The uplink reception may also be separately configured for each of the two nodes. In this example, the transmit power control commands of each enhanced control channel set may be associated with one of the two power control loops.

In one configuration, specific loops may be associated with specific downlink control information types. That is, the downlink control information in a typical control channel may always be associated with a fixed loop, such as, the first loop for the shared uplink channel and the uplink control channel. Additionally, the downlink control information for the enhanced control channel may be associated with one or more loops. Typically, the aforementioned downlink control information type based association can be deterministic or radio resource control signalled.

Other implicit associations may also be specified, such as implicit association based on decoding candidates, virtual cell IDs, subframe indices, subframe types, downlink control information formats, localized or distributed enhanced control channel, or a combination thereof. For example, if a first virtual cell ID is used by a control channel (or indicated in the control channel for the shared downlink channel or the shared uplink channel), the corresponding uplink transmission is associated with the first power control loop. Furthermore, if a second virtual cell ID is used by a control channel (or indicated in the control channel for the shared downlink channel or the shared uplink channel), the corresponding uplink transmission is associated with the second power control loop.

The determination/association may be performed on a per carrier basis when the UE is configured with carrier aggregation. That is, the number of timing advance and power control loops to use and the determination of which timing/power control loop to use for an uplink transmission can be determined on a per carrier basis.

Figure 7:
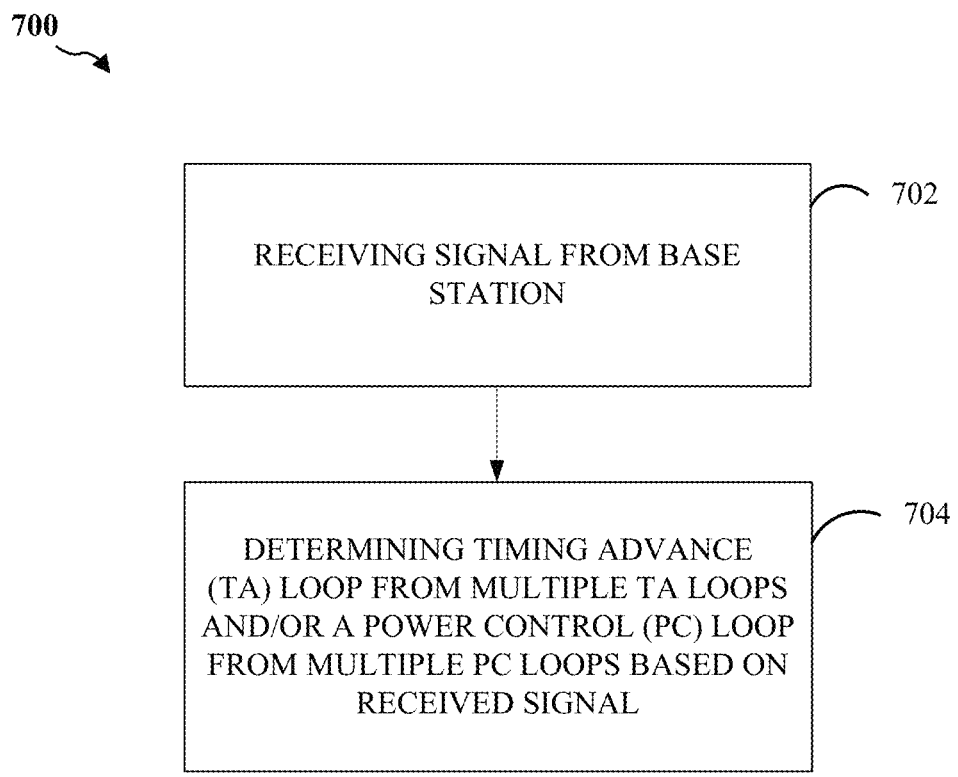
FIG. 7 is a flow diagram illustrating a method for loop control according to an aspect of the present disclosure.

FIG. 7 illustrates a method 700 for wireless communication. In block 702, a mobile device receives a signal from a bases station, such as an eNodeB. The mobile device determines a timing advance (TA) loop from a set of TA loops and/or a power control (PC) loop from a set of PC loops based on the received signal in block 704.

In one configuration, the UE 650 is configured for wireless communication including means for receiving. In one configuration, the receiving means may be the controller/processor 659, memory 660, receive processor 656, receiver 654, and/or antenna 652 configured to perform the functions recited by the receiving means. The UE 650 is also configured to include a means for determining. In one configuration, the determining means may be the controller/processor 659, memory 660, and/or receive processor 656 configured to perform the functions recited by the determining means. In another aspect, the aforementioned means may be any module or any apparatus configured to perform the functions recited by the aforementioned means.

Figure 8:
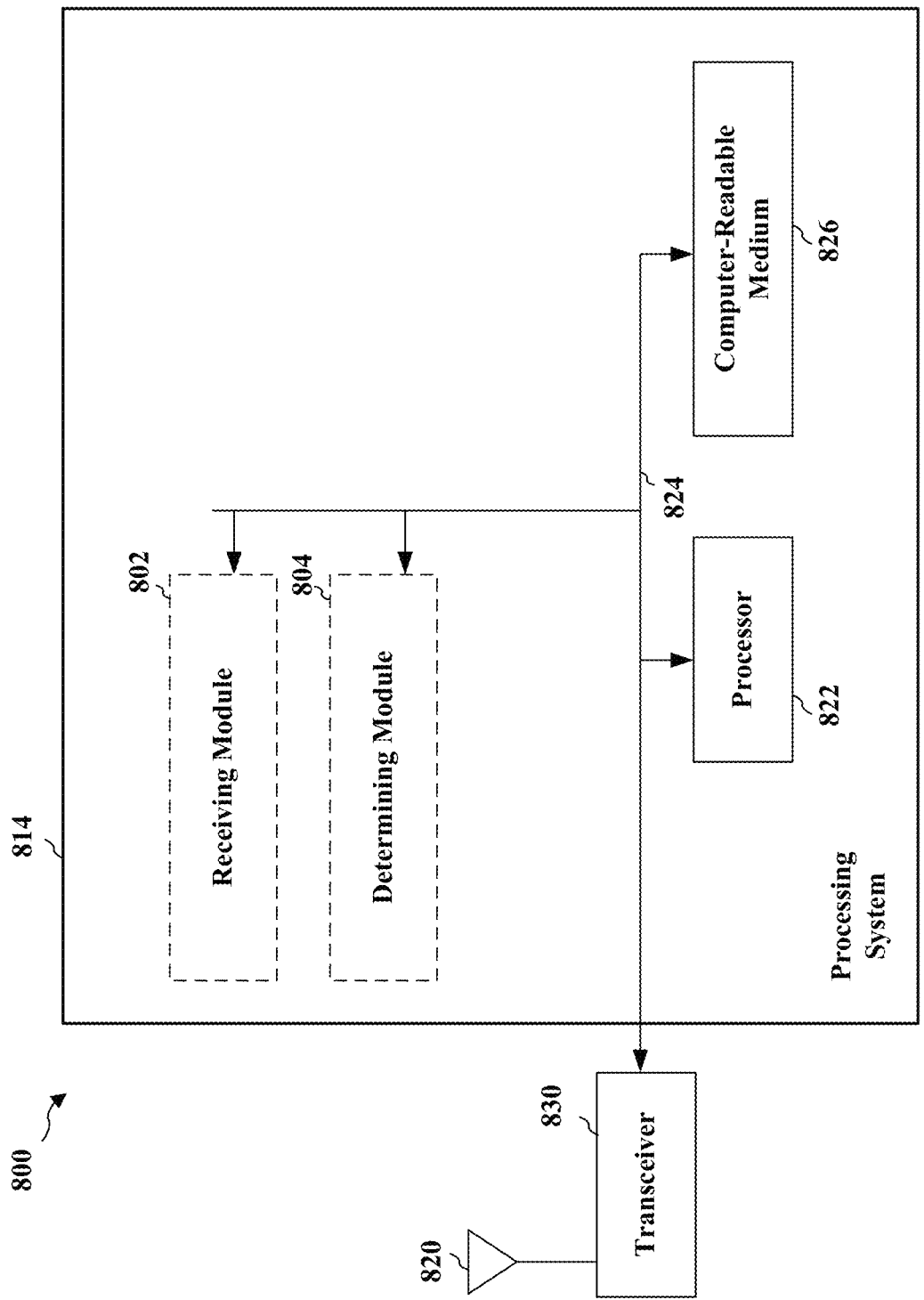
FIG. 8 is a conceptual data flow diagram illustrating a method for loop control according to an aspect of the present disclosure.

FIG. 8 is a diagram illustrating an example of a hardware implementation for an apparatus 800 employing loop control. The apparatus 800 may include a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware modules, represented by the processor 822 the modules 802, 804 and the computer-readable medium 826. The bus 824 may also link various other circuits such as timing sources, peripherals, voltage regulators, and power management circuits, which are well known in the art, and therefore, will not be described any further.

The processing system 814 may be coupled to a transceiver 830. The transceiver 830 is coupled to one or more antennas 820. The transceiver 830 enables communications with various other apparatus over a transmission medium. The processing system 814 includes a processor 822 coupled to a computer-readable medium 826. The processor 822 is responsible for general processing, including the execution of software stored on the computer-readable medium 826. The software, when executed by the processor 822, causes the processing system 814 to perform the various functions described for any particular apparatus. The computer-readable medium 826 may also be used for storing data that is manipulated by the processor 822 when executing software.

The processing system 814 includes a receiving module 802 for receiving a signal from an eNodeB. The processing system 814 also includes a determining module 804 for determining a timing advance (TA) loop from a set of TA loops and/or a power control (PC) loop from a set of PC loops based on the received signal. The modules may be software modules running in the processor 822, resident/stored in the computer-readable medium 826, one or more hardware modules coupled to the processor 822, or some combination thereof. The processing system 814 may be a component of the UE 650 and may include the memory 660, and/or the controller/processor 659.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
receiving, at a user equipment (UE) from a base station, a signal in a subframe of a plurality of subframes in a frame, the UE configured with:
a plurality of power control (PC) loops for a component carrier, and
at least one timing advance (TA) loop for the component carrier; and
determining, at the UE, a TA loop from the at least one TA loop and a first PC loop from the plurality of PC loops based on the received signal, the first PC loop determined based on a first subframe index that identifies the subframe of the received signal from the plurality of subframes within the frame without additional downlink control information (DCI) bits, the first subframe index associated with the first PC loop of the plurality of PC loops and a second subframe index associated with a second PC loop of the plurality of PC loops, the first subframe index being different from the second subframe index, the first PC loop being different from the second PC loop, and the first PC loop being implicitly determined by a DCI format.

2. The method of claim 1, in which the TA loop is further determined based at least in part on a timing advance loop index (TLI) field included in downlink control information (DCI) of the received signal.

3. The method of claim 1, further comprising associating a TA command with the TA loop based at least in part on a TA loop index of a media access control (MAC) payload.

4. The method of claim 1, in which the TA loop is further determined based at least in part on an enhanced physical downlink control channel (ePDCCH) set associated with the received signal; and
the method further comprises associating a TA command with the TA loop based at least in part on the ePDCCH set.

5. The method of claim 1, in which the TA loop is further determined based at least in part on a downlink control information (DCI) type, control channel decoding candidates, virtual cell IDs, subframe indices, subframe types, DCI formats, a control channel type, or a combination thereof.

6. The method of claim 1, in which the first PC loop is further determined based at least in part on a physical downlink shared channel rate matching and quasi-co-location indicator (PQI) field or scrambling ID ($n_{SCID}$) included in downlink control information (DCI) of the received signal.

7. The method of claim 1, in which the first PC loop is implicitly determined based at least in part on an enhanced physical downlink control channel (ePDCCH) set associated with the received signal.

8. The method of claim 1, in which the first PC loop is implicitly determined based at least in part on a downlink control information (DCI) type, control channel decoding candidates, virtual cell IDs, subframe types, DCI formats, a control channel type, or a combination thereof.

9. An apparatus for wireless communications, comprising:
means for receiving, at a user equipment (UE) from a base station, a signal in a subframe of a plurality of subframes in a frame, the UE configured with:
a plurality of power control (PC) loops for a component carrier, and
at least one timing advance (TA) loop for the component carrier; and
means for determining, at the UE, a TA loop from the at least one TA loop and a first PC loop from the plurality of PC loops based on the received signal, the first PC loop implicitly determined based on a first subframe index that identifies the subframe of the received signal from the plurality of subframes within the frame so that additional downlink control information (DCI) bits are not added to determine the first PC loop, the first subframe index associated with the first PC loop of the plurality of PC loops and a second subframe index associated with a second PC loop of the plurality of PC loops, the first subframe index being different from the second subframe index, the first PC loop being different from the second PC loop, and the first PC loop being implicitly determined by a DCI format.

10. The apparatus of claim 9, in which the means for determining the TA loop determines the TA loop based at least in part on a timing advance loop index (TLI) field included in downlink control information (DCI) of the received signal.

11. The apparatus of claim 9, in which the means for determining the TA loop determines the TA loop based at least in part on a downlink control information (DCI) type, control channel decoding candidates, virtual cell IDs, subframe indices, subframe types, DCI formats, a control channel type, or a combination thereof.

12. The apparatus of claim 9, in which the means for determining the first PC loop determines the first PC loop based at least in part on a downlink control information (DCI) type, control channel decoding candidates, virtual cell IDs, subframe types, DCI formats, a control channel type, or a combination thereof.

13. A non-transitory computer-readable medium having program code recorded thereon for wireless communication, the program code executed by at least one processor and comprising:
program code to receive, at a user equipment (UE) from a base station, a signal in a subframe of a plurality of subframes in a frame, the UE configured with:
a plurality of power control (PC) loops for a component carrier, and
at least one timing advance (TA) loop for the component carrier; and
program code to determine, at the UE, a TA loop from the at least one TA loop and a first PC loop from the plurality of PC loops based on the received signal, the first PC loop implicitly determined based on a first subframe index that identifies the subframe of the received signal from the plurality of subframes within the frame so that additional downlink control information (DCI) bits are not added to determine the first PC loop, the first subframe index associated with the first PC loop of the plurality of PC loops and a second subframe index associated with a second PC loop of the plurality of PC loops, the first subframe index being different from the second subframe index, the first PC loop being different from the second PC loop, and the first PC loop being implicitly determined by a DCI format.

14. The non-transitory computer-readable medium of claim 13, in which the program code to determine the TA loop further comprises program code to determine the TA loop based at least in part on a timing advance loop index (TLI) field included in downlink control information (DCI) of the received signal.

15. The non-transitory computer-readable medium of claim 13, in which the program code to determine the TA loop further comprises program code to determine the TA loop based at least in part on a downlink control information (DCI) type, control channel decoding candidates, virtual cell IDs, subframe indices, subframe types, DCI formats, a control channel type, or a combination thereof.

16. The non-transitory computer-readable medium of claim 13, in which the program code to determine the first PC loop further comprises program code to determine the first PC loop based at least in part on a downlink control information (DCI) type, control channel decoding candidates, virtual cell IDs, subframe types, DCI formats, a control channel type, or a combination thereof.

17. A user equipment (UE) configured for wireless communications, comprising:
  a memory; and
  at least one processor coupled to the memory, the at least one processor being configured:
    to receive, from a base station, a signal in a subframe of a plurality of subframes in a frame, the UE configured with:
      a plurality of power control (PC) loops for a component carrier, and
      at least one timing advance (TA) loop for the component carrier; and
    to determine a TA loop from the at least one TA loop and a first PC loop from the plurality of PC loops based on the received signal, the first PC loop determined based on a first subframe index that identifies the subframe of the received signal from the plurality of subframes within the frame without additional downlink control information (DCI) bits, the first subframe index associated with the first PC loop of the plurality of PC loops and a second subframe index associated with a second PC loop of the plurality of PC loops, the first subframe index being different from the second subframe index, the first PC loop being different from the second PC loop, and the first PC loop being implicitly determined by a DCI format.

18. The UE of claim 17, in which the at least one processor is further configured to determine the TA loop based at least in part on a timing advance loop index (TLI) field included in downlink control information (DCI) of the received signal.

19. The UE of claim 17, in which the at least one processor is further configured to associate a TA command with the TA loop based at least in part on a TA loop index of a media access control (MAC) payload.

20. The UE of claim 17, in which the at least one processor is further configured:
  to determine the TA loop based at least in part on an enhanced physical downlink control channel (ePDCCH) set associated with the received signal; and
  to associate a TA command with the TA loop based at least in part on the ePDCCH set.

21. The UE of claim 17, in which the at least one processor is further configured to determine the TA loop based at least in part on a downlink control information (DCI) type, control channel decoding candidates, virtual cell IDs, subframe indices, subframe types, DCI formats, a control channel type, or a combination thereof.

22. The UE of claim 17, in which the at least one processor is further configured to determine the first PC loop based at least in part on a physical downlink shared channel rate matching and quasi-co-location indicator (PQI) field or scrambling ID ($nsci_D$) included in downlink control information (DCI) of the received signal.

23. The UE of claim 17, in which the at least one processor is further configured to implicitly determine the first PC loop based at least in part on an enhanced physical downlink control channel (ePDCCH) set associated with the received signal.

24. The UE of claim 17, in which the at least one processor is further configured to implicitly determine the first PC loop based at least in part on a downlink control information (DCI) type, control channel decoding candidates, virtual cell IDs, subframe types, DCI formats, a control channel type, or a combination thereof.

* * * * *